June 29, 1965  C. M. JOHNSON ETAL  3,191,322
EARTH SCRAPER WITH PIVOTED CONVEYOR
Filed Feb. 8, 1963  2 Sheets-Sheet 1

INVENTORS
CHARLES M. JOHNSON
JAMES E. LOWDER
BY Cushman, Darby & Cushman
ATTORNEYS June 29, 1965  C. M. JOHNSON ETAL  3,191,322
EARTH SCRAPER WITH PIVOTED CONVEYOR
Filed Feb. 8, 1963  2 Sheets-Sheet 2
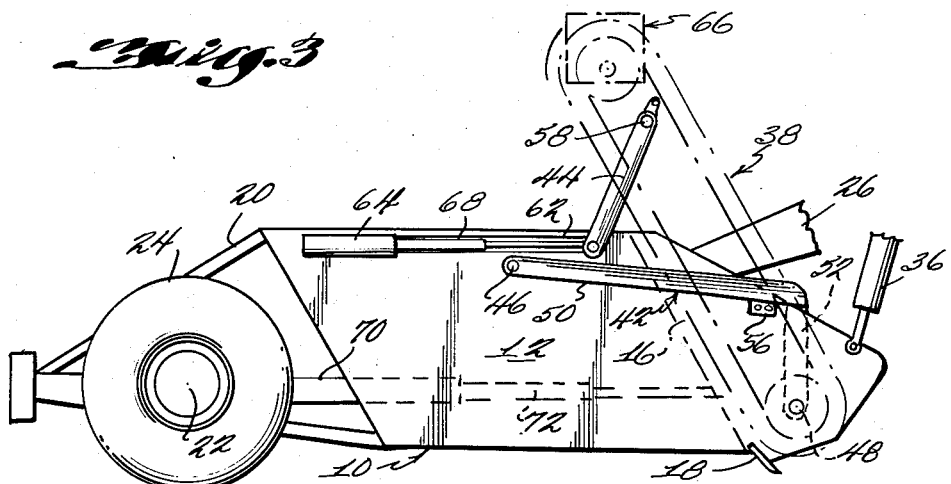
Fig. 3
Fig. 4
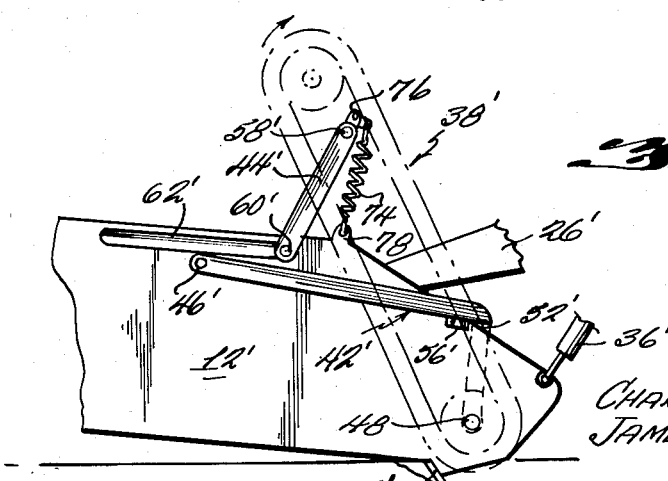
Fig. 6
INVENTORS
CHARLES M. JOHNSON
JAMES E. LOWDER
BY Cushman, Darby & Cushman
ATTORNEYS United States Patent Office 3,191,322
Patented June 29, 1965

3,191,322
EARTH SCRAPER WITH PIVOTED CONVEYOR
Charles M. Johnson and James E. Lowder, Lubbock, Tex., assignors to Johnson Manufacturing Company, Lubbock, Tex., a corporation of Texas
Filed Feb. 8, 1963, Ser. No. 257,277
8 Claims. (Cl. 37—8)

This invention relates to improvements in earth-moving and scraping machines of the mobile type which include an open-front dirt container, an earth-scraping blade at the front of the container and an endless conveyor mounted within the container for urging loosened earth rearwardly into the container. In particular it relates to improvements in the mounting and support of the conveyor.

In recent years it has become the practice to install a conveyor, generally of the endless chain type to which scraper flights are attached, in the dirt container or bowl of an earth-scraping machine. The rapid removal of the loosened dirt from the rear of the scraper blade by the conveyor effects more rapid filling of the bowl than was formerly possible and also permits a deeper cut to be made into the ground by the scraper blade than was formerly possible. An earth-scraping machine of this type is described in detail in the Johnson United States Patent No. 2,984,022 issued May 16, 1961, and the disclosure therein is incorporated here by reference. While that machine and others which include a conveyor are more efficient than machines which have no conveyor, they are susceptible to improvements which increase their scraping and loading efficiency even more.

It is therefore a primary object of the present invention to provide an earth-scraping machine having a conveyor therein with an improved mounting for the conveyor which increases the effectiveness of the conveyor in moving loose dirt rearwardly into the bowl.

It is a further object to provide an earth-scraping machine of the above type with a conveyor mounting which maintains the conveyor flights in contact with the loose dirt for a maximum length of time, yet which permits the conveyor to ride up over large stones or clods of earth which may pass over the scraper blade.

It is another object of the invention to provide an earth-scraping machine of the above type with a conveyor mounting which allows the position of the conveyor to adjust in accordance with the size of the load of dirt in the bowl so as to be in most effective contact with the incoming dirt at all times.

It is still another object to provide an earth-scraping machine with means which cooperate with a conveyor therein for more rapidly dumping the load of loose dirt.

Broadly, the machine of the present invention includes a pivotal mounting for the conveyor which permits the rear portion of an upwardly and rearwardly extending conveyor to move continuously from a relatively low, rearward position when the load of dirt is small to a relatively high, forward position as the size of the load increases. By this arrangement the flights on the conveyor act on the dirt coming into the bowl for a relatively large portion of its travel toward the rear of the bowl both when the load is small and as it increases. At the same time the upper portion of the conveyor does not tend to become buried because it rides on the forward surface of the dirt load and moves forwardly as the size of the load increases. Simultaneously with this action the mounting also allows the forward part of the conveyor to ride up on and over any large stones or the like which may pass over the scraper blade.

The structure of the mounting which accomplishes these functions includes a rigid lower support arm for the conveyor which is pivotally mounted at its forward end to the lower portion of the conveyor and at its rear end to a fixed pivot point and an upper support arm which is pivoted at one end to the upper portion of the conveyor and at its other end to a pivot point which is movable forwardly and rearwardly.

The invention will be more clearly understood from the following description of two illustrative embodiments taken with the drawings in which:

FIGURE 4 is a top plan view of the machine of FIGURE 1; and

FIGURES 5 and 6 are fragmentary side elevational views of a modification of the machine of FIGURE 1.

Figure 1:
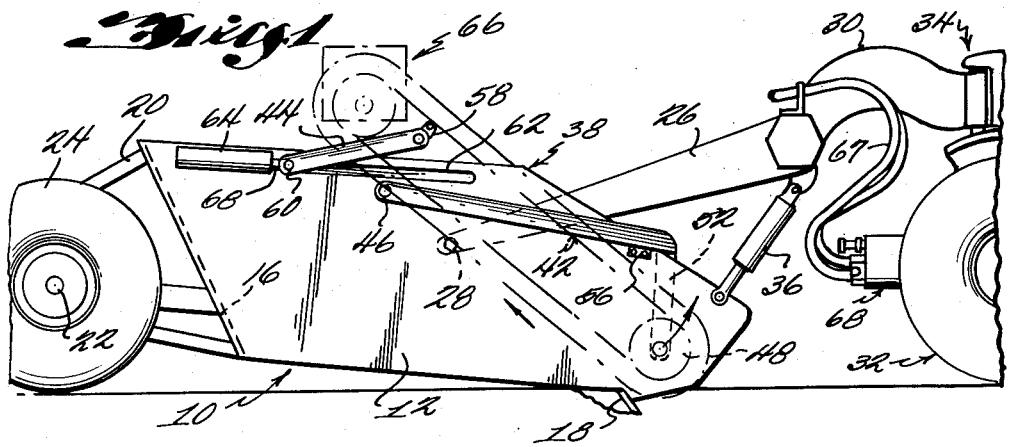
FIGURE 1 is a side elevational view of a scraper type earth-moving machine embodying the principles of the present invention and showing the conveyor in the position assumed at the beginning of a scraping operation.

Referring to FIGURES 1–4, there is shown therein an open-top and open-front earth-moving container 10 having side walls 12, a bottom wall 14 and a rear wall 16 which in the construction illustrated is movable longitudinally of the container between the side walls 12. At the forward end of the bottom wall 14 is a downwardly and forwardly extending scraper blade 18 which extends between the side walls 12. It will be understood that the term "side walls" used in the description refer not only to vertical plate members, but also to appropriate reinforcing and framing members (not shown). Rearwardly of the back wall 16 the container 10 is supported by means of frame members 20 which carry a transverse axle 22 on which are journaled a pair of laterally spaced, ground-engaging wheels 24.

Two arms 26 of a forked gooseneck structure straddle the forward end of the container 10 and have their rear ends pivotally connected to the side walls 12 by bolts 28. The stem 30 of the gooseneck is releasably connected at its forward end to the rear of a tractor 32 or other prime mover by means of a conventional coupling, illustrated at 34, which permits relative rotational movement between the container 10 and the tractor 32. A pair of double-acting hydraulic cylinders 36 are pivotally connected between the forward end of the container 10 and the arms 26 so that the container 10 may be raised and lowered for dumping and scraping, respectively.

Disposed within the open-front of the container is an upwardly and rearwardly inclined scraper-type endless conveyor 38 having its lower forward end disposed immediately above the scraper blade 18. The conveyor 38 may be of any conventional construction, such as that disclosed in Patent No. 2,984,022, but it will be understood that its details form no part of the present invention and that other scraper-type conveyors may be employed. The details of the conveyor 38 are therefore not described here, but it will be appreciated that the schematic showing is intended to illustrate a conveyor which includes a longitudinal frame provided at each end with a transverse shaft on which are mounted appropriate sprockets and rollers for receiving a conventional endless chain-and-flight arrangement.

As indicated above, the present invention relates to the mounting of the conveyor so as to permit movement thereof in a vertical plane during changes in the size of the dirt load in the container 10. In the construction illustrated this is accomplished by a pair of laterally-spaced, lower conveyor support arms 42 and a pair of laterally-spaced, longitudinally movable upper conveyor support arms 44. The lower support arms 42 extend longitudinally of the container side walls 12 and are pivoted at their rear ends to the side walls 12 for rotation about a transverse axis 46 and at their forward ends to the conveyor 38 at 48.

As shown, each lower support arm 42 includes an elongated straight portion 50 located outwardly of the side walls 12 and extending forwardly from the rear pivot point 46 which is located about midway between the rear container wall 16 and the scraper blade 18. Toward the front of the container the straight portion 50 joins a transverse portion 52 which extends inwardly of the side wall 12 and downwardly to the pivot point 48 which is coaxial with the lower shaft 54 of the conveyor 38. Conveniently, the pivot point 48 may be formed by suitably journaling the end of the shaft 54 in the lower end of the arm portion 52, as shown, or by pivotally connecting the lower end of the arm portion 52 to the frame of the conveyor as with a bolt. Downward pivotal movement of the lower support arms 42 is limited by a stop 56 secured to the exterior of each side wall 12 so as to prevent the lower end of the conveyor 38 from coming in contact with the scraper blade 18. The stops 56 may be made vertically adjustable if desired so as to adjust the position of the conveyor to different work conditions.

The upper conveyor support arms 44 are relatively short links which are pivoted to the upper portion of the conveyor frame at 58 and extend downwardly and rearwardly to locations outside the container side walls 12. The lower end of each upper arm 44 is provided with a roller 60 which is freely rotatable about a transverse axis and which is movable within a longitudinal guide structure 62 secured to the exterior of the side wall 12 near the top thereof. The guide structure 62 may be formed in any convenient manner as by securing an outwardly facing channel member to the exterior of each side wall 12. Alternatively, the guide structures 62 may be formed by cutting a slot in each of the side walls 12 to receive the rollers 60 and providing a guard interiorly of each slot to prevent dirt from entering the slots from the interior of the container 10.

Rearwardly of the upper conveyor support arms 44 is a pair of double-acting hydraulic cylinders 64 secured to the exterior of the side walls 12 as with brackets 65. A longitudinally movable piston rod 68 extends forwardly from each cylinder 64 and is pivotally connected to the respective roller 60 as by having a hole through which the axle of the roller passes.

Figure 2:
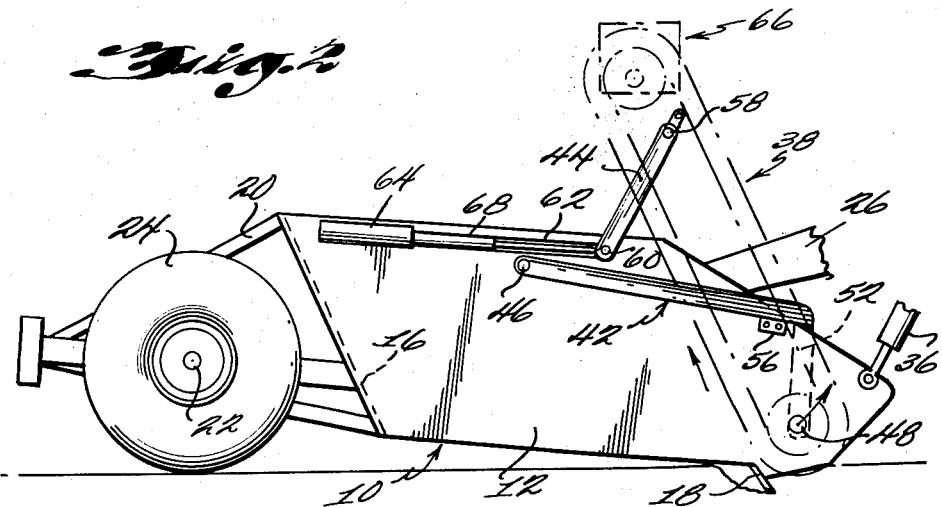
FIGURES 2 and 3 are views similar to FIGURE 1 showing the conveyor in the position assumed at the end of a scraping operation or at the end of a dumping operation, respectively.
Figure 3:
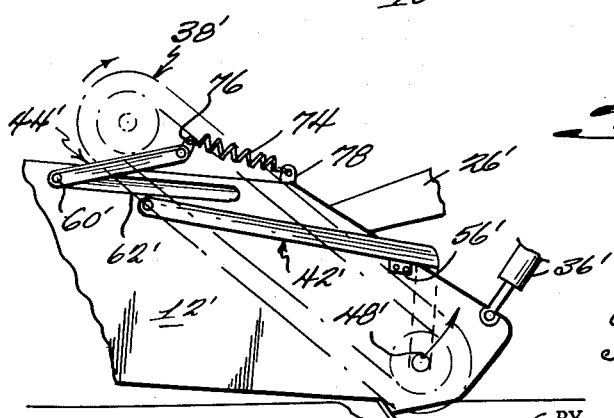

The support of the conveyor 38 by means of the above-described structure permits the conveyor to ride up over large stones or the like which may pass over the scraper blade 18 and also permits the upper part of the conveyor under the action of the hydraulic cylinder 64 to move upwardly and forwardly to the positions shown in FIGURES 2 and 3. Either of these movements results in displacement of the upper conveyor shaft which is conventionally power driven to operate the conveyor. It is desirable therefore, to provide a power-transmitting drive which is not complicated by or liable to damage by the relatively great movement of the conveyor relative to the power source on the tractor. As shown, the conveyor 38 is driven hydraulically by means of a hydraulic motor unit 66 secured to the upper end of the conveyor frame and suitable lines 67 to a motor driven hydraulic pump 68 located on the rear end of the tractor 32.

As fully disclosed in the copending application of Johnson and Lowder, entitled Earth Scraper With Hydraulically Operated Conveyor, Serial No. 255,591 filed February 1, 1963, the motor unit 66 includes a reversible hydraulic motor, a gear reduction unit driven by the motor and drivingly connected to the upper shaft of the conveyor 38 and a flywheel rotating at the same speed as the motor output shaft. The flywheel overcomes any tendency of the conveyor to stop as each scraper flight engages the loosened dirt passing over the scraper blade 18 and minimizes violent pressure surges within the hydraulic system which would otherwise occur at the same time.

Alternatively, the conveyor 38 can be driven by a reversible electric motor secured to the conveyor frame and connected by flexible electrical cables to a motor-driven generator on the tractor 32. It is possible, of course, to provide a mechanical conveyor drive from the conventional power take-off on the tractor using, for example, the power-transmitting coupling disclosed in the Johnson United States Patent No. 3,059,714 issued October 23, 1962. However, an electric or hydraulic drive is preferred from the standpoint of simplicity of construction and freedom from telescopic shafts and universal joints which are liable to breakage during hard use.

As an aid in effecting rapid dumping of a load of dirt from the container, the longitudinally movable back wall 16 is power-driven so as to force the dirt into engagement with the conveyor 38 which is then driven in counterclockwise direction as viewed in the drawings. As seen in FIGURE 3, a horizontal hydraulic cylinder 70 is secured to the conveyor frame rearwardly of the rear wall 16 and the forward end of its extensible inner members 72 is connected to the rear wall 16.

Referring to FIGURES 5 and 6 in which primed reference numerals are used to designate parts which are the same as parts already described, there is shown an embodiment in which a spiral tension spring 74 is used to yieldably urge the upper end of the conveyor downwardly and rearwardly. As shown, the upper end of each upper conveyor support arm 44' is provided with an upwardly extending ear 76 to which is connected one end of the spring 74. The spring extends forwardly and downwardly and has its forward end secured to an upstanding ear 78 on the top of the associated container side wall 12'. The rear ends of the arms 44' are provided with rollers 60' and roller guide structures 62' in the same manner as the embodiment of FIGURES 1-4, but the hydraulic cylinder 64 of the latter is omitted. As will be seen from a comparison of FIGURES 5 and 6, the distance between the spring supporting ears 76 and 78 is less in the FIGURE 5 position so that the spring 70 urges the conveyor 38' toward the FIGURE 5 position. The front of the conveyor 38' is supported by a pair of lower support arms 42' in the manner already described.

In operation of the scraper of FIGURES 1-4, loading of the container 10 is effected by extending the hydraulic pistons 36 so as to lower the scraper blade 18 into engagement with the ground. The container rear wall 16 is fully retracted and the conveyor 38 is tilted to its extreme rearward position as shown in FIGURE 1 by retracting the cylinders 64. The machine is then pulled forwardly over the ground by the tractor 32 so that loosened earth passes over the scraper blade 18 into the forward part of the container 10.

The conveyor 38, driven in a clockwise direction as viewed in the drawings, engages the dirt passing over the scraper blade 18 and urges it rearwardly into the container 10. The dirt will, of course, tend to pile up at the point at which the conveyor flights disengage from the dirt and this point is very close to the scraper blade when a scraping run is just starting. As the pile starts to build up in size the conveyor 38, by virtue of its angular displacement, engages relatively more of the surface of the pile and thus continuously moves dirt toward the top of the pile where it flows down the other side toward the rear of the container 10. The net result is that the dirt is moved more rapidly toward the rear of the container 10 than would occur if the conveyor 38 were fixed in a more upright position.

As the pile of dirt continues to grow in size and fills the space between the rear wall 16 and the conveyor 38, the latter is rotated clockwise about the axis 48 by gradually extending the piston rods 68 from the cylinders 64. This movement pushes the lower end of the upper support arms 44 forwardly and causes the upper end of the conveyor 38 to move forwardly and upwardly toward the position shown in FIGURE 2. Thus the conveyor continues to deliver loosened dirt to the forward face of the dirt pile as the pile grows and at the same time acts on the dirt for a maximum period of time.

Simultaneously with the above movement the conveyor 38 is free to ride up on and over large stones or other debris which may pass over the scraper blade 18. The lower support arms 42, when in engagement with the stops 56, position the lower end of the conveyor 38 slightly above the scraper blade 18. When large pieces of debris pass over the blade 18 and are engaged by the conveyor flights the conveyor 38 rotates counterclockwise about the axes determined by the upper and lower support arms 44 and 42. The lower end of the conveyor 38 thus moves upwardly to permit the debris to pass thereunder without jamming between the conveyor flights and the bottom wall 14. This movement does not require movement of the piston rod 68 which is associated with the upper support arm 44.

To empty the dirt from the machine the front of the container 10 is raised to disengage the scraper blade 18 from the ground as seen in FIGURE 3, and the container is again towed forwardly by the tractor 32. At the same time the rear wall 3 of the container 10 is gradually moved forwardly by the hydraulic cylinder from the position shown in FIGURE 1 to that shown in FIGURE 3 and the conveyor flights are rotated counterclockwise. During this operation the conveyor normally remains more or less in the forward position shown in FIGURES 2 and 3 although it may be shifted toward its FIGURE 1 position during the early part of a dumping run if desired.

The scraping and dumping operations of the embodiment of FIGURES 5 and 6 are substantially the same as those already described. The springs 74 connecting the upper support arms 44' to the side walls 12' urge the conveyor 38' toward the position shown in FIGURE 5. As the container fills with dirt during a scraping run, the continually growing pile of dirt forces the conveyor toward the position shown in FIGURE 6. During a dumping run the force of the cylinder 70' is transmitted to the dirt by the rear wall 16' and holds the conveyor in its FIGURE 6 position.

It will thus be seen that the objects of this invention have been fully and effectively accomplished. It will be realized, however, that the foregoing specific embodiments have been described only for the purpose of illustrating the principles of the invention and are subject to extensive change without departure from such principles. Therefore, this invention includes all modifications encompassed within the scope of the following claims.

What is claimed is:

1. A mobile earth-scraping machine comprising: an open-front container having bottom, side and rear walls; a scraper blade carried by said container at the front of said bottom wall and an endless scraper-type, rigid-frame endless chain conveyor extending upwardly and rearwardly in the forward part of said container; means mounting said conveyor for movement in a vertical plane toward and away from the bottom wall of said container; a conveyor support arm on each side of the conveyor, each arm being pivoted at one end to the upper portion of said conveyor frame and at its other end to a pivot point on the adjacent side wall for pivotal movement in a vertical plane; means mounting said pivot points for movement with respect to said side walls whereby the rear end of said conveyor is free to swing upwardly and downwardly relative to said container so as to assure that said conveyor continuously acts on substantially the entire forward face of the pile of dirt which accumulates in said container during a scraping operation.

2. Apparatus as in claim 1 wherein said means mounting the lower end of said conveyor includes an arm on each side of the conveyor, each of said arms extending generally longitudinally of said container and pivoted at their forward ends to the lower portion of said conveyor frame and pivoted at their rear ends to said container side walls at fixed locations rearwardly of the lower portion of said conveyor.

3. Apparatus as in claim 2 wherein each of said longitudinal arms has a downwardly extending portion at its forward end, the extremity of which is pivoted to said conveyor frame, said downwardly extending portion being disposed inwardly of the respective side wall and the remainder of the arm being disposed outwardly of the respective side wall whereby the upper edge of the respective side wall serves as a step for limiting downward movement of the arm.

4. Apparatus as in claim 1 wherein said means mounting said pivot points includes a roller associated with each of said other ends of said support arms and a roller guide associated with each container side wall and extending longitudinally thereof.

5. Apparatus as in claim 1 wherein said means mounting said pivot points includes an extensible ram connected at one end to one of said container side walls and at the other end to the respective support arm near said other end thereof.

6. Apparatus as in claim 1 including guide means for guiding said other ends of said support arms in longitudinal paths relative to said container and spring means yieldably urging the upper end of said conveyor rearwardly and downwardly.

7. Apparatus as in claim 6 wherein said spring means includes a tension spring connected at one end to said container and at its other end to one of said support arms.

8. In a mobile earth-scraping machine which includes an open-front container having bottom, side and rear walls; a scraper blade carried by said container at the front of said bottom wall and a rigid-frame chain scraper-type conveyor extending upwardly and rearwardly in the forward part of said container, the improvement which comprises: means pivotally mounting the frame of said conveyor on said container side walls for swinging movement in a vertical plane simultaneously about two axes extending transversely of said container, the forward end of said conveyor being free to swing upwardly relative to said container; means positioning one of said axes in a fixed location rearwardly of said conveyor; and means for adjusting the position of said second axis longitudinally along said container.

References Cited by the Examiner

UNITED STATES PATENTS

| | | | |
|---|---|---|---|
| 2,301,098 | 11/42 | Twyman. | |
| 2,548,754 | 4/51 | Vereschagin | 37—126 |
| 2,679,119 | 5/54 | Robb | 37—126 |
| 2,791,041 | 5/57 | Hancock | 37—8 |
| 2,984,022 | 5/61 | Johnson | 37—8 |
| 2,994,139 | 8/61 | Carston | 37—8 X |

FOREIGN PATENTS 122,716  1926  Switzerland.

CHARLES E. O'CONNELL, *Primary Examiner.*

BENJAMIN HERSH, *Examiner.*